United States Patent [19]

Sato

[11] 4,239,363

[45] Dec. 16, 1980

[54] ELECTRONICALLY CONTROLLED SELF-TIMER FOR CAMERA

[75] Inventor: Yuichi Sato, Kanagawa, Japan

[73] Assignee: Olympus Optical Co., Ltd., Tokyo, Japan

[21] Appl. No.: 11,437

[22] Filed: Feb. 12, 1979

[30] Foreign Application Priority Data

Mar. 15, 1978 [JP] Japan .................................. 53-33962

[51] Int. Cl.³ ........................ G03B 9/64; G03B 17/00; G03B 17/38
[52] U.S. Cl. .................................. 354/238; 354/266; 354/293
[58] Field of Search .............................. 354/237–240, 354/266–269, 289, 288, 293

[56] References Cited

U.S. PATENT DOCUMENTS

| Re. 29,276 | 6/1977 | Mitani et al. ........................... 354/32 |
| 3,938,165 | 2/1976 | Asano ............................... 354/238 X |
| 4,114,173 | 9/1978 | Tezuka et al. ....................... 354/238 |

Primary Examiner—L. T. Hix
Assistant Examiner—Thomas H. Tarcza
Attorney, Agent, or Firm—Weinstein & Sutton

[57] ABSTRACT

An electronically controlled self-timer for a camera includes a self-timer operating member in the form of a plate having an increased size which is displaceably disposed in the bottom surface or in one lateral side of camera body. When it is displaced to enable a self-timer operation, it extends in the same plane as the bottom surface of the camera body to provide an additional support to the camera, while permitting an indication of the fact that the self-timer operation is enabled, at one glance.

8 Claims, 9 Drawing Figures

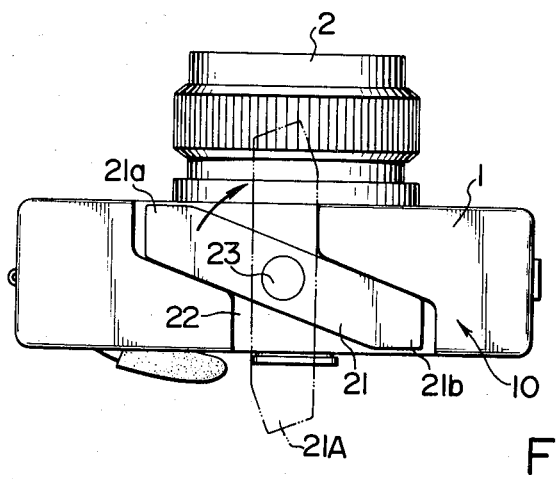
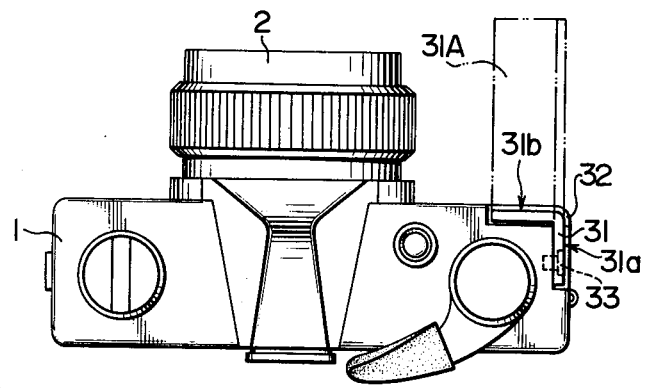
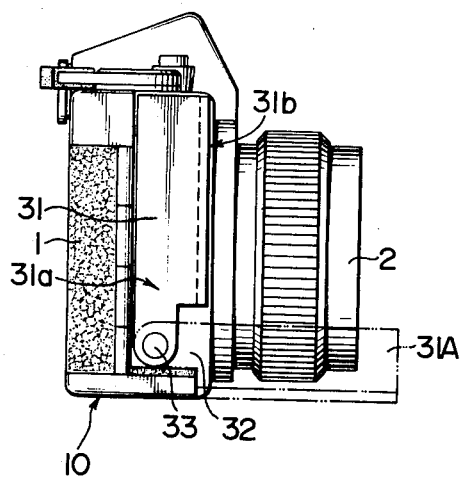

ELECTRONICALLY CONTROLLED SELF-TIMER FOR CAMERA

BACKGROUND OF THE INVENTION

The invention relates to an electronically controlled self-timer for a camera, and more particularly, to an operating member associated therewith.

An electronically controlled self-timer which delays a shutter operation by a given time determined by an electrical delay circuit is simpler in construction and requires less space than a mechanical self-timer which involves a governor, and can be mounted on any location selected. With a camera which incorporates an electrical shutter, a mere addition of a delay circuit to the electrical shutter circuit permits it to be controlled by a self-timer switch, providing a very advantageous arrangement.

An electronically controlled self-timer is arranged such that its operation is enabled by a self-timer switch which is operated through a self-timer operating member, allowing a self-timer operation to be performed in response to the depression of a shutter button in the similar manner as it occurs in a mechanical self-timer. However, there is a difference between the electronically controlled self-timer and mechanical self-timer in respect of providing an indication of a self-timer operation. With a mechanical self-timer, an operating member returns to its initial position during the time the self-timer is in operation, thus giving an indication that the self-timer is in operation. However, with an electronic self-timer, the operating member maintains its position in which it holds the switch operative during the time the self-timer is in operation, and hence there must be some means which indicates the fact that the self-timer is in operation.

Another disadvantage of conventional electronically controlled self-timers is the fact that the operating member comprises a transfer knob of a very small size, which therefore may be left in its operative position by inadvertence, causing a next photographing operation to be initiated with the self-timer in operative condition.

A camera incorporating an electronically controlled self-timer having described disadvantages is illustrated in FIGS. 1 and 2. In these Figures, a camera body 1 includes a lens barrel 2, film winding knob 3, shutter button 4 and film rewind knob 5. An operating member of an electronically controlled self-timer is shown as a transfer knob 6 which is rotatably mounted on a shutter release rod on which the shutter button 4 is mounted. When it is turned 90° clockwise as viewed in FIG. 2, to position 6A, the self-timer is rendered operative. In response thereto, a self-timer switch SW (see FIG. 3) is opened to connect a self-timer delay circuit 7 in circuit with the remainder of a shutter drive circuit.

Referring to FIG. 3, there is shown a circuit diagram of an electrical circuit which is used to drive a shutter. The circuit includes a power source 9 across which an electromagnet starting circuit 8 is connected in series with a main switch SW1. The circuit 8 has an output terminal which is connected with an electromagnet Mg which is adapted to drive a shutter. A self-timer delay circuit 7 is connected between the source 9 and the starting circuit 8 in series with a release switch SW2. The delay circuit 7 is normally short-circuited by the self-timer switch SW which is connected across its input and output terminals. Consequently, in the normal operation, the depression of shutter button 4 to close the release switch SW2 does not activate the circuit 7, only activating the starting circuit 8 to energize the electromagnet Mg to operate the shutter. However, when the transfer knob 6 is turned to position 6A, the switch SW becomes open, whereby the delay circuit 7 is enabled. As a result, the depression of the shutter button to close the release switch SW2 activates the delay circuit 7, allowing a self-timer operation to take place. After a given length of time delay, the starting circuit 8 is activated to energize the electromagnet Mg to operate the shutter.

As will be understood from the foregoing description, the transfer knob 6 which represents an operating member for the self-timer, is a small piece which is fitted over the shaft on which the shutter button 4 is mounted. Consequently, a user may inadvertently and often forget to return it to its original position after a self-timer operation has taken place, causing a failure in the next photographing operation.

SUMMARY OF THE INVENTION

It is an object of the invention to provide an electronically controlled self-timer for camera which eliminates described disadvantages of the prior art, by utilizing the fact that the self-timer operating member remains stationary during its operation to allow the operating member to be used in holding the camera in a stable position while the self-timer is in operation and simultaneously to provide an indication that the self-timer is in operation.

In accordance with the invention, the self-timer operating member has an increased size in order to permit a recognition of the fact that it is in a position to activate the self-timer, at one glance. This eliminates the difficulty that it may be left in position after the self-timer operation has taken place. When the operating member is in a position to activate the self-timer, it extends in a common plane as the bottom surface of the camera body, so that it may be utilized in holding the camera in a stable manner when taking a picture with the camera placed in a desk, table or the like. The operating member may also be utilized as a tripod to provide an exposure over a prolonged period of time.

BRIEF DESCRIPTION OF THE DRAWINGS

FIG. 7 is a bottom view of the camera including a self-timer operating member according to another embodiment of the invention;

FIG. 8 is a bottom view of the camera including a self-timer operating member constructed according to a further embodiment of the invention; and FIG. 9 is a side elevation of the camera shown in FIG. 8.

DESCRIPTION OF PREFERRED EMBODIMENTS

Figure 1:
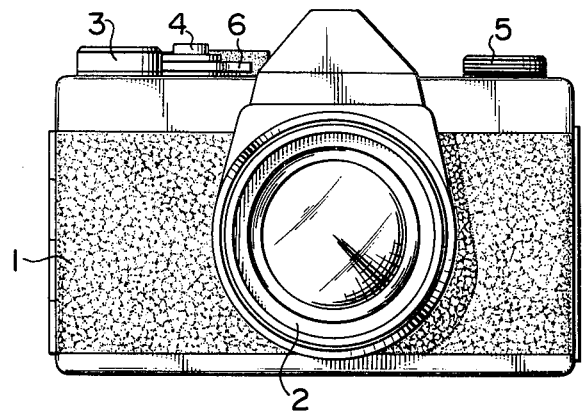
FIG. 1 is a front view of an exemplary camera including a conventional electronically controlled self-timer.
Figure 2:
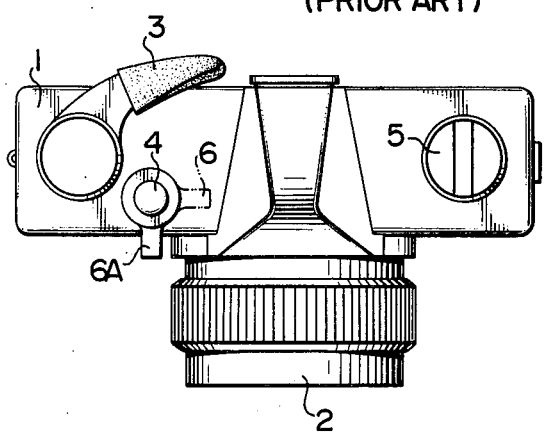
FIG. 2 is a plan view of the camera shown in FIG. 1.
Figure 3:
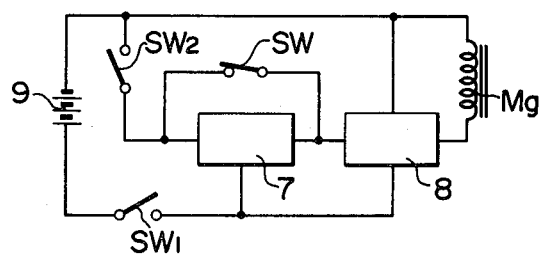
FIG. 3 is a circuit diagram of an electrical circuit which may be used in an electronically controlled self-timer.
Figure 4:
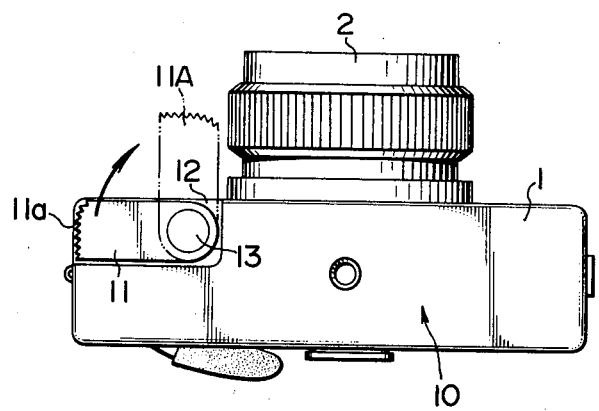
FIG. 4 is a bottom view of a camera including a self-timer operating member according to one embodiment of the invention.
Figure 5:
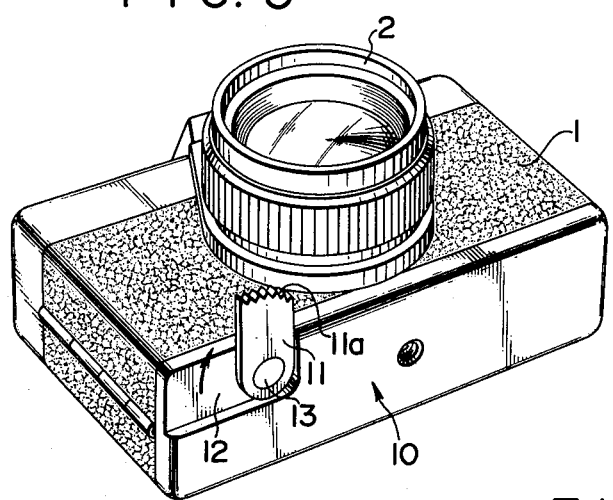
FIG. 5 is a perspective view of the camera shown in FIG. 4, illustrating the self-timer operating member.
Figure 6:
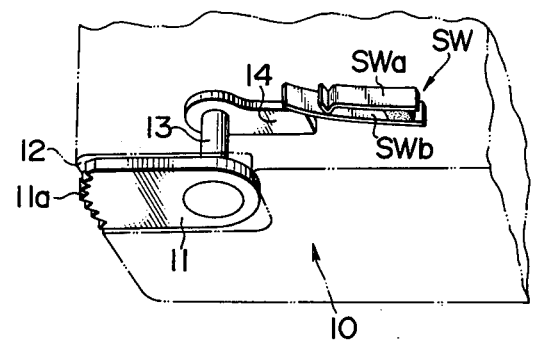
FIG. 6 is a perspective view of an operating mechanism associated with the self-timer switch.

Referring to FIGS. 4 to 6, there is shown a self-timer operating member according to one embodiment of the invention which is disposed on the bottom of a camera. As shown in FIGS. 4 and 5, a self-timer operating member is in the form of a transfer knob 11 which is strip-shaped. Camera body 1 includes a bottomplate 10, and the knob 11 is rotatably mounted in one corner of the bottomplate 10 toward the front side of the camera. The corner has substantially the same configuration as the transfer knob 11, and is defined by a recess 12 having a depth which corresponds to the thickness of the knob 11. One end of the knob 11 is secured to a rotary shaft 13 which is disposed in an inner end of the recess 12. Thus, the bottom surface of the transfer knob 11 lies in the common plane as the outer surface of the bottomplate 10. The shaft 13 is rotatable through substantially 90° clockwise (as viewed in FIGS. 4 and 5), by operating the knob 11, which can then be brought to a displaced position 11A where it enables the self-timer by opening the switch SW (see FIG. 3) to permit the delay circuit 7 to be operated in response to the depression of the shutter button.

FIG. 6 shows a mechanism which opens or closes the switch SW. A switch actuator 14 is fixedly mounted on a portion of the rotary shaft 13 which extends into the interior of the camera. The free end of the actuator 14 is adapted to open or close the switch SW which is located adjacent thereto. Specifically, the switch SW comprises a normally open leaf switch including a pair of movable blades SWa, SWb. In the disabled position of the self-timer when the transfer knob 11 is received within the recess 12, the actuator 14 urges the both blades SWa, SWb into contact with each other to close the switch SW. However, when the transfer knob 11 is turned to the position shown in FIG. 5, a rotation of the actuator 14 allows the blades SWa, SWb to be separated from each other, thus opening the switch SW. It is to be understood that the transfer knob 11 can be maintained in its operative and non-operative position by a suitable click-stop mechanism. It will be noted that the free end of the transfer knob 11 is knurled as shown at 11a, to facilitate its operation.

With the self-timer operating member of the invention, when it is turned to its operative position to enable the delay circuit 7, it extends at right angles to the length of the bottom of the camera and in the common plane as the latter, thereby providing a positive indication that the self-timer is enabled. In addition, it provides an additional support for the camera by preventing the camera, as placed on a table or the like, from becoming upset.

FIG. 7 shows another embodiment of the invention in which the self-timer operating member is in the form of a transfer lever 21 which is located centrally in the bottomplate 10 of the camera body 1. The lever 21 is formed by an elongate strip, which is received within a recess 22 formed in the central region of the bottomplate 10 and having a depth corresponding to the thickness of the lever 21. At its center, the lever 21 is pivotally mounted by means of a rotary shaft 23 so as to be rotatable in the clockwise direction.

When the lever 21 is turned to a self-timer enabling position 21A shown in phantom line, the opposite ends 21a, 21b of the lever extend in the back-and-forth direction of the camera which is parallel to the optical axis of the lens, thus transversely crossing the length of the camera to provide an additional support to the camera. It should be understood that in the position 21A, the lever 21 opens the self-timer switch SW. As before, it is maintained in its operative (phantom line) and inoperative position (solid line) by a click-stop mechanism, not shown.

FIGS. 8 and 9 show a further embodiment of the invention in which the self-timer operating member is disposed on one lateral side of the camera. In this instance, the self-timer operating member is in the form of a transfer knob 31 which is defined by an elongate strip which is L-shaped in cross section. The knob 31 is received in a recess 32 which is formed in the lateral side of the camera body 1 adjacent to the front end thereof. The lower end of a strip portion 31a of the knob 31, which bears against the lateral side, is fixedly mounted on a rotary shaft 33 which is rotatably mounted in the lateral side of the camera, and the knob can be turned substantially 90° clockwise, as viewed in FIG. 9, about the axis of the shaft 33 to assume a phantom line position 31A in order to enable the self-timer operation. At phantom line position 31A, the outer side of a strip portion 31b, which bears against the front side of the camera body 1 when the knob is in its vertical position, lies in a common plane as the bottom surface of the camera body 1. It should be understood that the knob 31 opens the self-timer switch SW when it is turned to the position 31A. In addition, it is maintained in its operative (phantom line) and inoperative position received within the recess 32, by a suitable click-stop mechanism, not shown.

When the transfer knob 31 is turned forwardly of the camera body 1 to enable the self-timer operation, it extends at right angles to the camera body 1, thereby contributing to a stable support of the camera. Since the knob 31 has undergone an angular movement through 90° to reach the phantom line position 31A, the fact that the self-timer operation is enabled can be recognized at one glance.

What is claimed is:

1. An electronically controlled self-timer for a camera comprising a camera, a self-timer operating member for actuating a self-timer switch to enable a self-timer operation, the operating member being disposed within a recess formed in the bottom surface of the camera body in a displaceable manner, the operating member extending in the same plane as the bottom surface of the camera body and perpendicular to the camera body when it is displaced to actuate the self-timer switch, said operating member in said actuating position also operating to stabilize said camera on a surface on which it is to be placed.

2. A self-timer according to claim 1 in which the operating member is in the form of a strip-like plate of large size and is disposed in one corner of the bottom plate of a camera body adjacent to the front of the camera, in a rotatable manner.

3. A self-timer according to claim 1 in which the operating member is in the form of a transfer lever defined by an elongate strip of large size which is rotatably disposed in the central region of the bottomplate of the camera body.

4. A self-timer according to claim 5 in which the operating member is L-shaped in cross section and is disposed in one corner of the camera body adjacent to the front of the camera so as to be angularly movable in a vertical plane.

5. An electronically controlled self-timer for a camera comprising a camera, a self-timer operating member for actuating a self-timer switch to enable a self-timer operation, the operating member being disposed within a recess formed in the lateral side of the camera body in a displaceable manner, the operating member extending in the same plane as the bottom surface of the camera body when it is displaced to actuate the self-timer switch, said operating member in said actuating position also operating to stabilize said camera on a surface on which it is to be placed.

6. A camera comprising an electronically controlled self-timer, a self-timer switch for enabling operation of said self-timer, a self-timer operating member for actuating said self-timer switch and movable between an inoperative position and an operative position, said self-timer operating member being completely disposed within a recess formed in the camera body when said operating member is in said inoperative position, and said self-timer operating member extending out of said recess and in the same plane as the bottom surface of the camera body when in said operative position to stabilize said camera on a surface on which it is to be placed.

7. A camera in accordance with claim 6, wherein said operating member in said operative position acts as an indicator that said self-timer has been enabled.

8. A self-timer according to claim 1 wherein said bottom surface includes a longitudinal axis, said operating member extending perpendicular to said longitudinal axis when said operating member is moved to the position to actuate the self-timer switch.

* * * * *

UNITED STATES PATENT AND TRADEMARK OFFICE
CERTIFICATE OF CORRECTION

PATENT NO. : 4,239,363
DATED : December 16, 1980
INVENTOR(S) : Yuichi Sato

It is certified that error appears in the above—identified patent and that said Letters Patent is hereby corrected as shown below:

Column 2, line 42, change "in" to --on--.

Signed and Sealed this

Seventeenth Day of March 1981

[SEAL]

Attest:

RENE D. TEGTMEYER

Attesting Officer     Acting Commissioner of Patents and Trademarks